United States Patent [19]
Kondo

[11] 3,935,595
[45] Jan. 27, 1976

[54] TAPE RECORDER WITH CARTRIDGE SELECTING MEANS

[76] Inventor: Toru Kondo, 2-12, Hosenji, Kashiwara, Osaka, Japan

[22] Filed: Mar. 21, 1973

[21] Appl. No.: 343,543

[52] U.S. Cl.................................... 360/92; 360/63
[51] Int. Cl.² .................. G11B 15/68; G11B 15/29; G11B 23/04
[58] Field of Search............ 360/92, 63, 91; 226/90, 226/109, 144, 176, 177, 180, 174

[56] References Cited
UNITED STATES PATENTS

| | | |
|---|---|---|
| 3,646,258 | 2/1972 | Lemelson.............................. 360/92 |
| 3,703,251 | 11/1972 | Suzuki................................... 360/92 |
| 3,756,487 | 9/1973 | Pechi..................................... 360/92 |
| 3,812,537 | 5/1974 | Grae et al............................. 360/92 |
| 3,816,851 | 6/1974 | White et al........................... 360/92 |
| 3,821,814 | 6/1974 | Gordon et al........................ 360/92 |

Primary Examiner—Alfred H. Eddleman

[57] ABSTRACT

The present invention relates to an improvement of a tape recorder for endless tape cartridges. The tape recorder comprises storing means for storing several endless cartridges in piled or stacked condition, reproducing means for playing the cartridges, and selecting means for selecting a desired cartridge from the stored cartridges. Said reproducing means includes an elongated capstan shaft positioned near pinch rollers for the cartridges, several magnetic heads and a conventional electrical circuit for reproducing the magnetic tape of the cartridge. The said selecting means includes several pressure rollers positioned in V-shaped notches of the cartridges, respectively, several offset cams adapted to individually press the pressure rollers thereby pressing the pinch rollers of the cartridges to the elongated capstan shaft, and an electrical control circuit for electrically selecting the action of the desired cam, thereby playing the desired cartridge.

1 Claim, 7 Drawing Figures

TAPE RECORDER WITH CARTRIDGE SELECTING MEANS

BACKGROUND AND SUMMARY

The present invention relates to an improvement of a tape recorder for endless tape cartridges, and more particularly to means for selecting a desired cartridge from a plurality of stored cartridges in storing means and reproducing the sounds of the selected cartridge without moving from its position in the storing means.

An object of the present invention is to provide a novel tape recorder that affords selecting a desired cartridge from the stored cartridge in the storing means and reproducing the selected cartridge without moving from its position in the storing means so that the space for storing the cartridges can be compact and an electricity failure and other troubles can be avoided.

In carrying out the invention in one aspect thereof, a tape recorder is provided in which the apparatus comprises storing means for storing several endless cartridges in stacked condition, reproducing means for playing the cartridges, and selecting means for selecting a desired cartridge from the stored cartridges. Said reproducing means includes an elongated capstan shaft positioned near pinch rollers of the cartridges, several magnetic heads, and a conventional electrical circuit for reproducing the magnetic tape of the cartridge. The said selecting means includes several pressure rollers positioned in V-shaped notches of the cartridges, respectively, several offset cams adapted to individually press the pressure rollers thereby pressing the pinch rollers of the cartridges to the elongated capstan shaft, and an electrical control circuit for electrically selecting the action of the desired cam thereby playing the desired cartridge.

Other objects and advantages of the subject invention will become apparent from reading the following detailed description and by reference to the accompanying drawing where:

Figure 1:
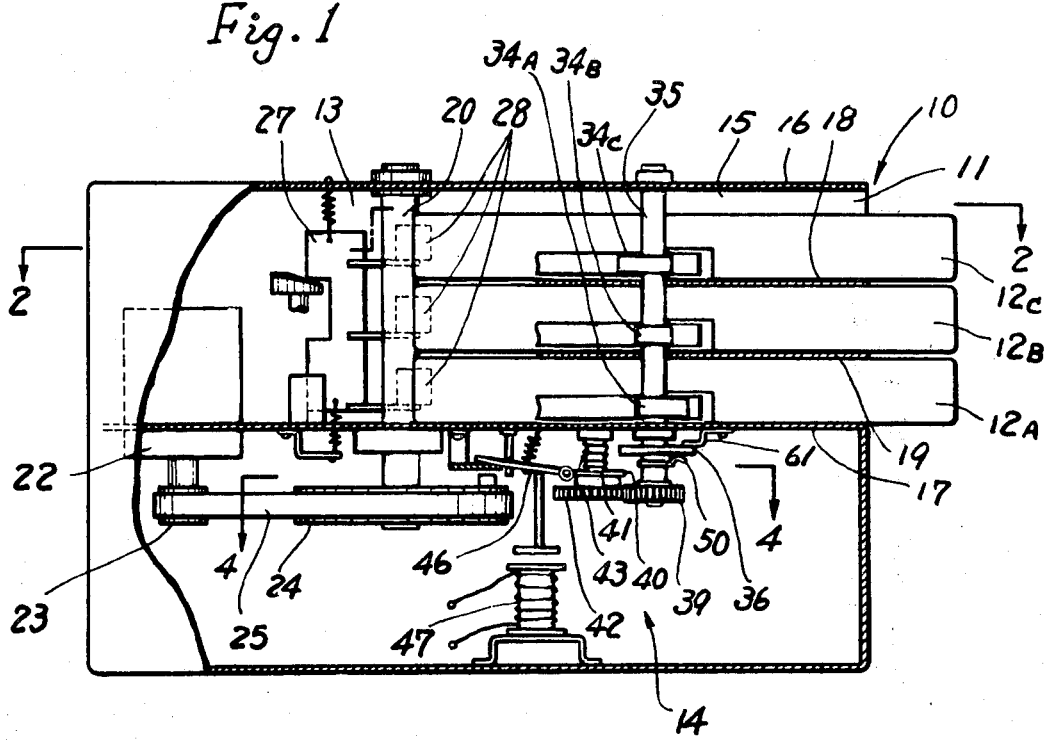
FIG. 1 is a plan view, partially broken away, of a tape recorder in accordance with the present invention.
Figure 3:
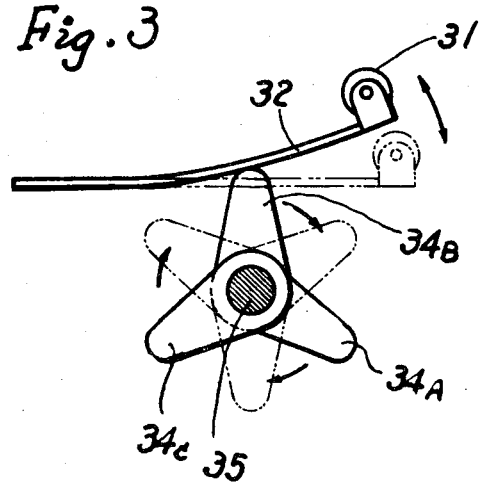
FIG. 3 is an enlarged plan view of parts of cams and cooperating members in selecting means of the present invention.
Figure 2:
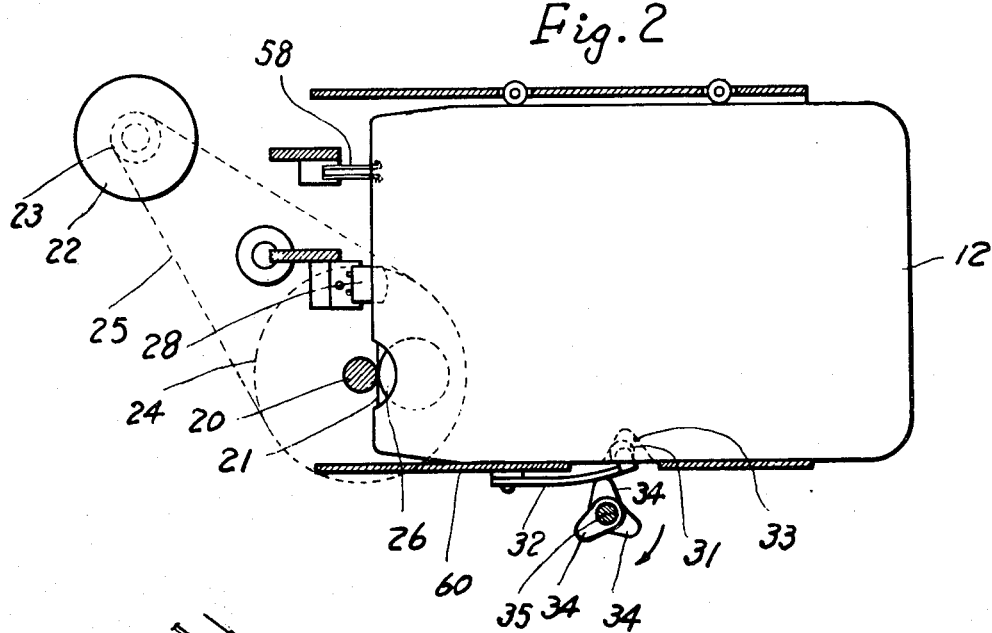
FIG. 2 is a diagramatic sectional view taken along the line 2—2 in FIG. 1.

Referring particularly to FIG. 1 and FIG. 2 of the drawings, a combination of tape recording-playing device 10 is constructed and operable to handle magnetic tape of the type contained in a cartridge commonly known as a "cassette."

The device 10 comprising storing means 11 for storing three cartridges 12A, 12B and 12C, reproducing means or playing means 13 for playing the magnetic tape of the cartridge, and selecting means 14 for selecting a cartridge cartride from the stored cartridges to play the desired cartridge.

As illustrated in FIG. 1, the storing means 11 is provided with three spaces 15 which are defined by upper and lower frame plates 16, 17, and two horizontal intermediate plates 18 and 19, each of said plates being fixed to a frame of the device 10. Each of the three cartridges is stored in the appropriate space 15 in stacked condition.

Figure 7:
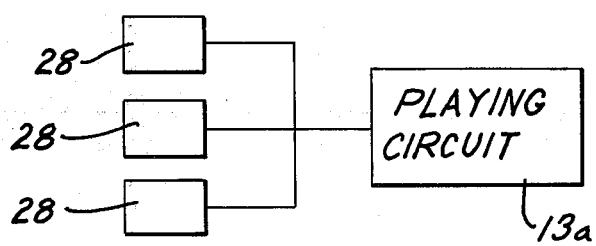
FIG. 7 is a schematic illustration of the conventional electric circuit for reproducing or playing the cartridge.

The playing means 13 includes a vertically elongated capstan shaft 20, three magnetic heads 28 and a conventional electric circuit 13a (FIG. 7) for reproducing the cartridge. Said elongated capstan shaft 20 is rotatably supported by the upper and lower frame plates 16 and 17 and is driven by a motor 22 through pulleys 23 and 24 and belt 25. The three magnetic heads 28 are supported by a supporting plate 27 and each of the heads 28 are positioned close to an appropriate magnetic tape 21 contained in the cartridge 12. Each of said three cartridges is provided with a pinch roller 26 to force a magnetic tape 21 of the cartridge against the capstan shaft 20 and the latter being positioned near the pinch rollers 26. The electrical circuit for regenerating the magnetic tape of the cartridge is conventional, so that illustration of the circuit is omitted.

Figure 4:
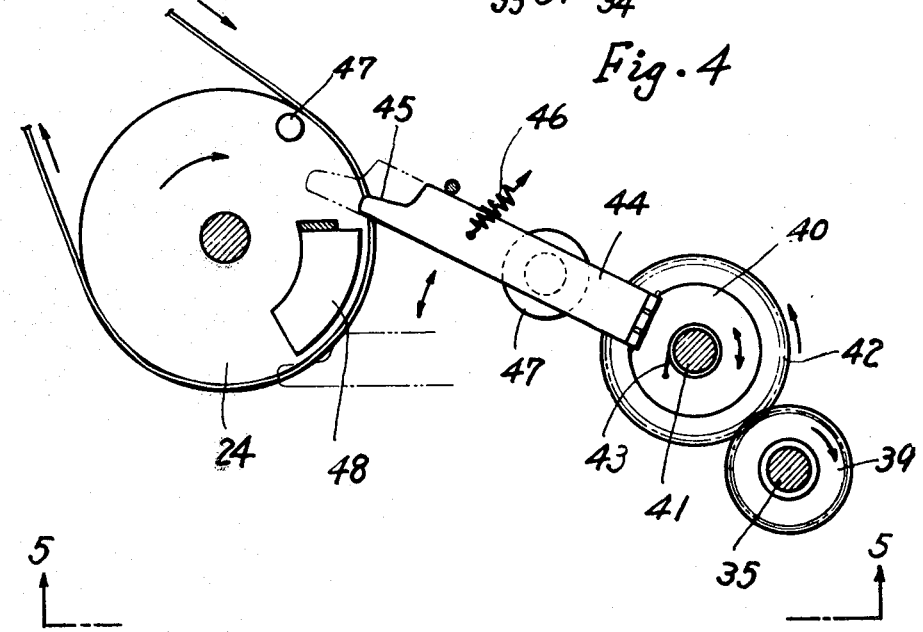
FIG. 4 is an enlarged sectional view taken along the line 4—4 in FIG. 1.
Figure 5:
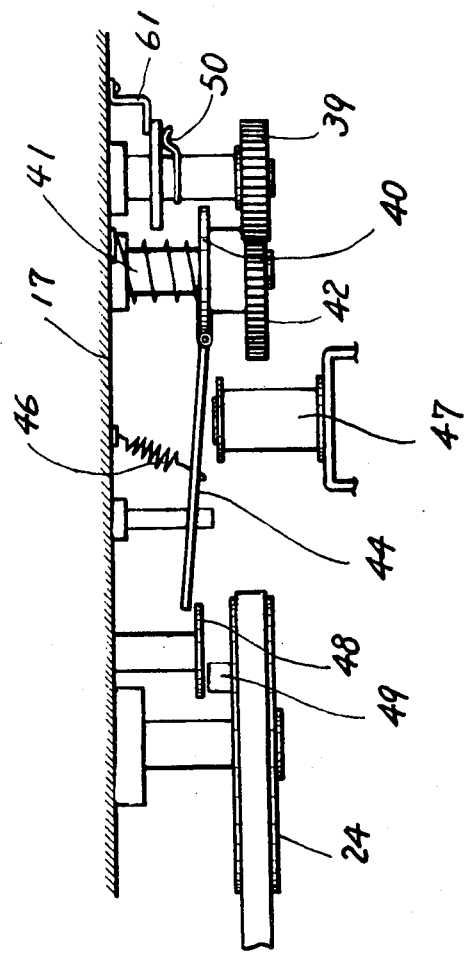
FIG. 5 is a side view taken along the line 5—5 in FIG. 4

The said selecting means 14 for selecting a desired cartridge from the stored cartridges 12 includes three pressure rollers 31, each of which is positioned in a V-shaped notch 33 formed on a side of each cartridge 12. Each roller 31 is supported by an appropriate elastic rod 32 at one end thereof, and the rods 32 are fixed to a side frame 60 of the device 10 at the other end thereof. To press the desired elastic arm 32 with the pressure roller 31, three offset cams 34A, 34B and 34C securely mounted on a common shaft 35 are provided. A position of the projection of each cam is different from each other and is successively arranged at intervals of 120 degrees to each other, whereby the cams actuate the arm in rotation. At the exposed lower end of the vertical shaft 35, a driven gear 39 and a rotary contact arm 50 are securely mounted, and the rotary contact arm 50 is cooperated with six contact points 37A, 37B, 37C, 38A, 38B and 38C on a stationary disc 36 fixed to the lower frame plate 17 by a stay 61. As illustrated in FIGS. 1, 4 and 5, a disc 40 having a return spring 43 and a drive gear 42 engaged with said gear 39 are rotatably mounted on an axis 41 which is securely supported by the lower frame plate 17, the disc 40 being so connected to the drive gear 42 that only the rotation of the counterclockwise direction of the disc 40 is transmitted to the gear 42 by means of a conventional ratchet mechanism (not shown). Extending from the edge of the disc 40 is an elongated oscillating arm 44 having a tip 45, said arm 44 being normally upwardly pulled by a spring 46. A solenoid 47 is positioned beneath the arm 44 to pull down the latter opposed to the action of the spring 46. The tip 45 of the arm 44 is so arranged as to engage with a pin 49 on the pulley 24 when the arm is dropped by the action of the solenoid 47. Above the pulley 24 a horizontal guide plate 48 is positioned and supported by the lower frame plate 17, a gap for passing the tip 45 thus being defined between the pulley 24 and the guide plate 48.

Figure 6:
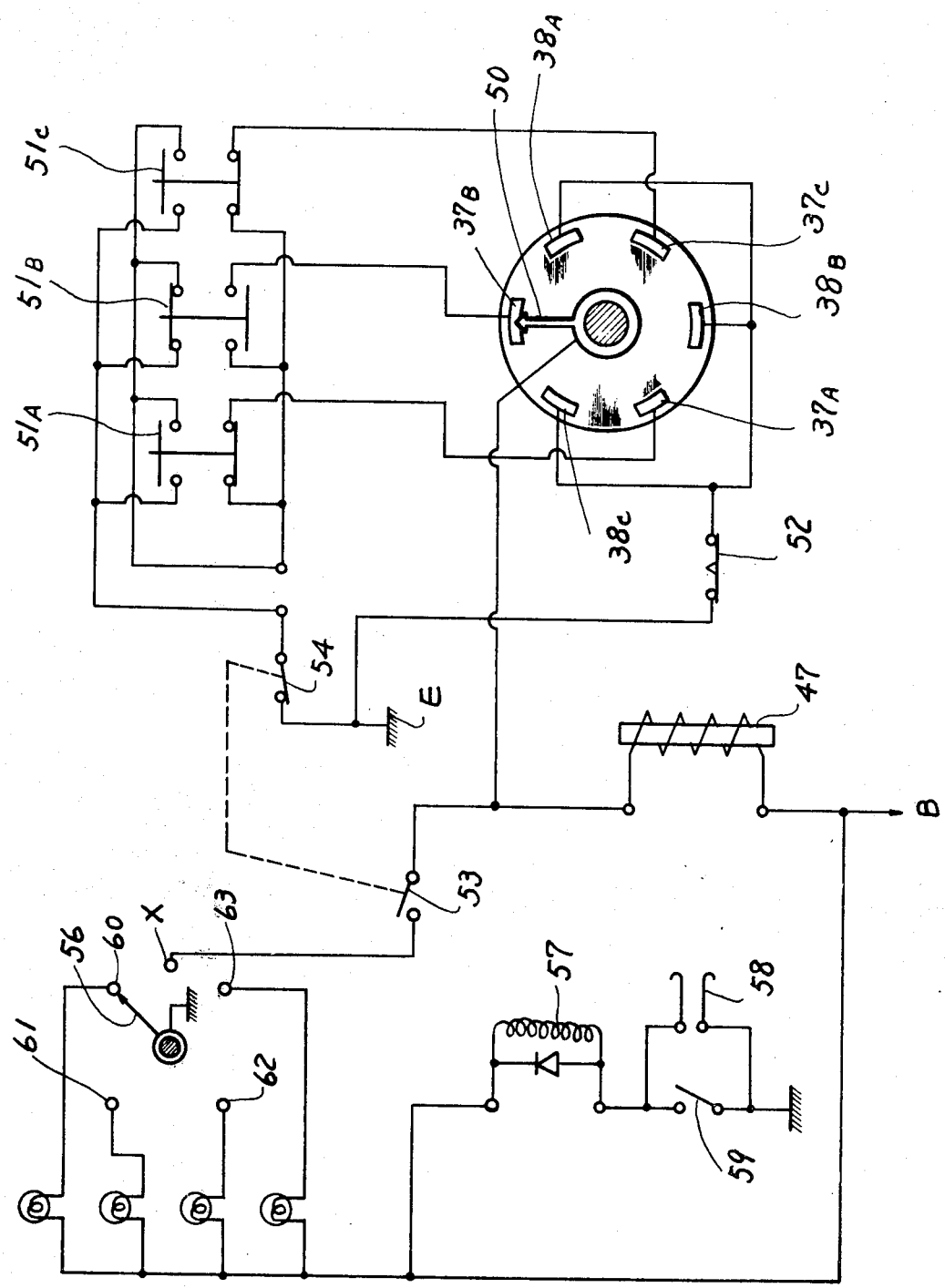
FIG. 6 is an electrical control circuit of the selecting means of the present invention.

In FIG. 6 there is shown a control circuit for selecting a desired cartridge in which three punch switches 51A, 51B and 51C are connected with the contact points 37A, 37B and 37C, respectively, that is, the switch 51A to the point 37A, the switch 51B to the point 37B and the switch 51C to the point 37C. The three push switches are of the type of alternative selective switch. In FIG. 6 the pushed condition of the push switch 51B is illustrated, and in this condition the cartridge 12B corresponding to the switch 51B is pressed to the appropriate head 28B by the appropriate cam 34B, the elastic arm 32 and pressure roller 31, the cartridge 12B thus being in playing condition. Now, when the third cartridge 12C is desired, the push switch 51C corresponding the cartridge 12C is pushed and changed into OFF condition. By reason of that the push switches 51A to 51C are formed of the type of alternative selective switch, the push switch 51B is automatically changed into ON condition by manipulation of the push switch 51C. Thus, the electrical connection between a power source B and ground E via the solenoid 47, the rotary contact arm 50, the contact point 37B and the push switch 51B is formed, thereby energizing the solenoid 47. By the action of the solenoid 47, the oscillating arm 44 is dropped, and the tip 45 of the arm is then engaged with the pin 47 on the rotating pulley 24 to rotate the arm 44 with the disc 40. The rotation of the disc 40 is transmitted to the cam shaft 35 via the gears 42 and 39, thereby rotating the cams 34A, 34B and 34C. With the rotation of the cam shaft 35 the rotary contact arm 50 is removed from the stationary contact point 37B, deenergizing the solenoid 47. However, as the tip 45 of the arm 44 is positioned beneath the guide plate 48, the oscillating arm 44 is not raised and the rotation of the oscillating arms 44 is continued until the tip 45 of the arm 44 is relieved from the guide plate 48, and then the arm 44 is returned to original position by the action of the return spring 46. The length of the guide plate 48, that is, the degree of rotation of the arm 44 is so determined that when the top 45 of the arm is cammed out from beneath the guide plate 48, the rotary contact arm 50 is shifted to the next stationary contact point 38A. As the contact point 38A is connected with ground E via a stop switch 52, the solenoid 47 is energized again and the rotary contact arm 50 is shifted to the next stationary contact point 37C which is connected with the pushed switch 51C. As the pushed switch 51C is in the OFF condition, the connection between the power source B and the ground E is cut, thereby stopping the cam shaft 35. In this state, the cam 34C presses the rod 32 with the pressure roller 31 positioned in the V-shaped notch 33 of the third cartridge 12C to press the latter towards the capstan shaft 20. The pinch roller 26 of the third cartridge 12C is thus pressed against the pinch roller 20 to drive the magnetic tape 27, thereby reproducing the tape by means of the conventional playing means involving the magnetic head 28.

In the present invention, said three cartridges can also be reproduced automatically and in sequence. In this case, a change-over switch 53 is manually closed and a switch 54 linked to the switch 53 is opened. By the above manipulation the power source B is connected to a contact point X of a rotary switch 55 through the solenoid 47 and the changeover switch 53. The rotary switch 55 is adapted to successively change four channels which are generally included in the magnetic tape of the cartridge 12. To rotate a rotary contact arm 56 and to change the channels in order, there is provided a solenoid 57. When a senser 58 senses marks which are formed at each end of the channels in the magnetic tape of the cartridge 12, a sensing switch 59 is closed and the solenoid 57 is energized whereby the rotary contact arm 56 is shifted from a contact point 60 of "1channel" to a contact point 61 of "2channel." In the same way, the rotary contact arm 56 is successively shifted to a contact point 63 of "4channel" via a contact point 62 of "3channel" and then shifted to the contact point 60 of 1channel. In the midst of the last shifting motion of the rotary contact arm 56, the latter is contacted with the contact point X, energizing the first solenoid 47. This creates the same result as the first mentioned action of the change of the cartridges. Thus, three cartridges may be regenerated automatically and in sequence.

From the above explanation, it will be easily understood that in the present invention all cartridges can be regenerated in position without moving whereby the space for storing each cartridge may be compacted. Further, as percussions which are generally created by moving the cartridge are avoided, electricity failure and other troubles may be avoided.

I claim:
1. A tape recorder comprising
   a. storing means for storing a plurality of endless tape cartridges in stacked condition, each of said cartridges having an endless magnetic tape, a pinch roller, and a V-shaped notch formed on a side thereof;
   b. reproducing means including an elongated capstan shaft positioned near the pinch rollers of the cartridges, a plurality of magnetic heads, and an electrical circuit for controlling the play of the magnetic tape of the cartridge; and
   c. selecting means for selecting the desired cartridge, said selecting means including a plurality of pressure rollers, each of the pressure rollers being positioned in one of the V-shaped notches of the cartridges, an offset cam associated with each pressure roller and adapted to press the associated pressure roller thereby pressing the pinch roller of the cartridge toward the elongated capstan shaft, each cam being securely mounted on a common shaft, a first gear mounted on said common shaft, a second gear engaging said first gear for rotation therewith, a disc mounted on the second gear so that rotation of the disc in one direction is transmitted to the second gear, an elongated arm connected to the disc and extending therefrom, a solenoid below the arm for lowering the arm, a pulley mounted on the capstan shaft and having a pin engageable with the arm when the arm is dropped by the solenoid, the arm and the disc being rotated in said one direction by the pulley when the pin engages the arm, and an electric control circuit for electrically selecting the action of the desired cam by energizing the solenoid thereby playing the desired cartridge, each of said pressure rollers being supported by an elastic rod at a free end thereof, said cams being adapted to individually press the elastic rod thereby pressing the pressure rollers.

\* \* \* \* \*